United States Patent
Hideya

(10) Patent No.: US 8,187,093 B2
(45) Date of Patent: May 29, 2012

(54) GAME SOUND OUTPUT DEVICE, GAME SOUND CONTROL METHOD, INFORMATION RECORDING MEDIUM, AND PROGRAM

(75) Inventor: Kazunori Hideya, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 755 days.

(21) Appl. No.: 12/304,975

(22) PCT Filed: Jun. 12, 2007

(86) PCT No.: PCT/JP2007/061810
§ 371 (c)(1),
(2), (4) Date: Dec. 15, 2008

(87) PCT Pub. No.: WO2007/145209
PCT Pub. Date: Dec. 21, 2007

(65) Prior Publication Data
US 2009/0286600 A1 Nov. 19, 2009

(30) Foreign Application Priority Data
Jun. 16, 2006 (JP) .................................. 2006-166941

(51) Int. Cl.
A63F 13/00 (2006.01)
A63F 13/02 (2006.01)
(52) U.S. Cl. .......................................... 463/32; 463/35
(58) Field of Classification Search .................... 463/35, 463/32
See application file for complete search history.

(56) References Cited

U.S. PATENT DOCUMENTS

| 6,361,439 B1 | 3/2002 | Kawamoto |
| 6,572,475 B1 | 6/2003 | Okabe |

FOREIGN PATENT DOCUMENTS

| EP | 1226853 A2 | 6/2003 |
| EP | 1795240 A1 | 6/2007 |
| JP | 10-211358 | 8/1998 |
| JP | 2002-336544 | 11/2002 |
| JP | 2003-062327 | 3/2003 |
| JP | 2003-190624 | 7/2003 |
| JP | 2004-195210 | 7/2004 |
| WO | WO 2006/033260 A1 | 3/2006 |

OTHER PUBLICATIONS

Translation of International Search Report for PCT/JP2007/061810, Jun. 2011.* International Search Report PCT/JP2007/061810 dated Aug. 28, 2007.
Supplementary European Search Report of Aug. 19, 2009 for Patent Application No. EP07745097, 7 pages.

* cited by examiner

Primary Examiner — Evan Pert
(74) Attorney, Agent, or Firm — Howard & Howard Attorneys PLLC

(57) ABSTRACT

An overlap identifying unit (205) obtains respective directions of the sound emitting objects with respect to the hearing position and identifies each one of sound emitting objects whose directions overlap. A sound volume estimation unit (206) estimates respective sound volumes of sounds as heard at the hearing position, emitted from the sound emitting objects that the overlap identification unit identified as overlapping. A sound emission control unit (207) cancels the sound emission of either one of the identified sound emitting objects identified, in a case where a difference between sound volumes obtained from those respective sound volumes estimated by the sound volume estimation unit (206) is at a predetermined level or greater. A sound source (208) reproduces sound effects or the like of the predetermined volumes. A game sound output unit (209) suitably outputs the game sound reproduced from the sound source (208).

8 Claims, 7 Drawing Sheets

GAME SOUND OUTPUT DEVICE, GAME SOUND CONTROL METHOD, INFORMATION RECORDING MEDIUM, AND PROGRAM

TECHNICAL FIELD

The present invention relates to a game sound output device, a method for controlling game sound, an information recording medium, and a program that are suitable for adequately outputting game sounds emitted from virtual sound emitting objects disposed in virtual space.

BACKGROUND ART

Various game devices (video game devices or the like) have conventionally been developed for household and business use. These game devices typically display game images wherein characters or other objects are disposed in virtual space. While displaying the game image, the game devices output game sounds including sound effects, background sounds, and voices.

Recent advancements in hardware performance or growth of image processing related technology, etc. have realized rapid (real-time) rendering of fine (realistic) game images. This has created a situation in which players can enjoy games feeling as if they were actually in the virtual space.

On the other hand, game sounds may not have experienced so sufficient improvement as compared to the game images. However, its balancing with the game images is created by enhancing background sound, and so on.

Furthermore, games of some sort have contrivances to improve the reality of game sound. One such example in the disclosed techniques (see, i.e. Patent Literature 1) is a three-dimensional game apparatus configured to: identify in a racing game the kind of surrounding non-moving objects (tunnels, walls, or trees, etc.); and varies a virtual reflected sound from the non-moving objects in accordance with the kinds of the non-moving objects.

Patent Literature 1: Unexamined Japanese Patent Application KOKAI Publication No. 2002-336544 (see pages 4-5 and FIG. 1)

DISCLOSURE OF THE INVENTION

Problems to be Solved by the Invention

Because a game device has a limited number of channels (number of sound sources) available for concurrently emitting sounds, it switches the game sounds that are being output so as to accord to the circumstantial or other factors.

For example, the game device excludes non-continuous game sounds from reproduction where the objects emitting the sounds are located in distance.

Nevertheless, some situations or scenes may require emitting more than the channel number of game sounds. Therefore, it was conventional to set an order of priority for each game sound (each sound emitting object) and make a selection of the game sounds for the number of channels in accordance with the order of priority.

Such a priority-based selection of game sounds, however, has sometimes resulted in an unnatural game sound output that gives players the feelings of incongruity.

One such case is explained by assuming the following. A same priority order is given to a sound of a gunshot, a footstep, and a scream; one of them is excluded from reproduction to yield to another game sound of a higher order of the priority. A character nearby shoots a gun and a character in distance screams. Then if the sound of gunshot is excluded, it comes to the result that the sound of gunshot, the key sound, is not output while a scream, which is the smaller, is output.

Accordingly, because of the game sound not matching to a situation in the game, the player feels extreme unnaturalness and a sense of incongruity.

The present invention is made to solve the above problem, and its objective is to provide a game sound output device, a method for controlling game sound, an information recording medium and a program that can adequately output a game sound emitted from a virtual sound emitting object disposed in virtual space.

Means for Solving the Problem

A game sound output device according to a first aspect of the present invention is configured to output, as a game sound, sounds being heard at a virtual hearing position and each having been emitted from each of a plurality of virtual sound emitting objects disposed in virtual space and comprises an overlap identifying unit, a sound emission control unit, and a game sound output unit.

First, the overlap identifying unit obtains respective directions of the sound emitting objects with respect to the hearing position and, for example, identifies each one of sound emitting objects whose directions overlap within a predetermined range of angle. That is, not only those sound emitting objects whose directions are completely the same, but also sound emitting objects, whose directions are within a predetermined range of angle difference, are identified as sound emitting objects whose directions overlap.

Further, the sound emission control unit causes either one of the identified overlapping sound emitting objects to stop sound emission, in accordance with a relationship between the respective sound volumes, the relationship being obtained from the identified overlapping sound emitting objects. For example, in a case where the difference between the respective sound volumes is equal to or greater than a predetermined level (for example, equal to or greater than 10 dB), the sound emission control unit causes the sound emitting object, whose sound volume is the smaller, to stop sound emission. Then, the game sound output unit generates a sound signal from sound emitting objects other than the sound emitting object whose sound emission has been stopped and outputs a game sound heard at the hearing position.

In this way, wasteful use of channels is avoided by stopping sound emission itself of a sound that is hardly to be heard, under a situation where the directions of the sound emitting objects overlap and there is more than a predetermined amount of difference between the sound volumes. Those channels not being used can be allocated to other sound emitting objects effectively. Making the game sound that is eventually output (mixed sound) defective is thus avoided and a clear game sound can be output.

This allows adequately outputting a game sound emitted by a virtual sound emitting object disposed in virtual space.

The above game sound output device may further comprise a sound volume calculation unit that calculates respective sound volumes of sounds as heard at the hearing position, emitted from the respective sound emitting objects which the overlap identification unit identified as overlapping.

In this case, the volume of sound as heard at the hearing position, actually emitted from the sound emitting object, can be obtained.

The sound emission control unit may cause a sound emitting object, whose sound volume is the smaller, to stop sound emission in a case where a difference between sound volumes obtained from the identified overlapping sound emitting objects is equal to or greater than a predetermined level.

In this case, emission of a sound that is hardly to be heard can be stopped, and wasteful use of channels can be avoided.

A game sound output device according to a second aspect of the present invention is configured to output, as a game sound, sounds being heard at a virtual hearing position and each having been emitted from each of a plurality of virtual sound emitting objects disposed in virtual space, comprises an overlap identifying unit, a sound emission control unit and a game sound output unit.

The overlap identifying unit obtains the respective directions of the sound emitting objects with respect to the hearing position and, for example, identifies each one of sound emitting objects whose directions overlap within a predetermined range of angle. That is, not only the sound emitting objects whose directions are completely the same, but also those sound emitting objects whose directions are within a predetermined range are identified as those sound emitting objects whose directions overlap.

Further, the sound emission control unit moves a sound emission position of either one of the respective sound emitting objects from an original position of disposal, in accordance with a relationship between the respective sound volumes, the relationship being obtained from the identified overlapping sound emitting objects.

For example, in a case where the difference between the respective sound volumes is equal to or greater than a predetermined level (for example, equal to or greater than 10 dB), the sound emission control unit virtually moves a sound emission position of a sound emitting object whose sound volume is the smaller to a position that does not cause overlap, while retaining the position of disposal on the screen as it is and moving only a sound emission position. Then, the game sound output unit generates a sound signal from sound emitting objects including the sound emitting object whose sound emission position has been moved and outputs a game sound heard at the hearing position.

In this way, effective sound emission that can be heard by a player is made possible by moving a sound emission position of a sound that is hardly to be heard, from an original position of disposal to positions that do not cause overlap, under a situation where the direction of the sound emitting objects overlap and there is more than a predetermined amount of difference between the sound volumes. Making the game sound that is eventually output (mixed sound) defective is thus avoided and a clear game sound can be output.

This achieves appropriate output of a game sound emitted by a virtual sound emitting object disposed in virtual space.

The sound emission control unit may move a sound emitting object, whose sound volume is the smaller, to a plurality of sound emission positions determined based on a relationship between the hearing position and a disposal position, in a case where a difference between sound volumes obtained from the identified overlapping sound emitting objects is equal to or greater than a predetermined level.

In this case, a sound emission with effective volume that can be heard by a player is made possible by moving a sound emitting object emitting a sound that can hardly be heard, to a plurality of sound emission positions that do not cause overlap.

The sound emission control unit may cause the moved sound emitting object to stop sound emission in a case where at the moved sound emission position there is another object whose direction overlaps.

In this case, adverse effects of overlap accompanied by the move of the sound emission position can be prevented and wasteful use of channels can be avoided.

A method for controlling game sound according to a third aspect of the present invention is a method for controlling game sound in a game sound output device configured to output, as a game sound, sounds being heard at a virtual hearing position and having been emitted from a plurality of virtual sound emitting objects disposed in virtual space, and comprises an overlap identifying step, sound emission control step, and a game sound output step.

First, an overlap identifying step obtains respective directions of the sound emitting objects with respect to the hearing position and, for example, identifies each one of sound emitting objects whose directions overlap within a predetermined range of angle. That is, not only a sound emitting object whose direction is completely the same, but also a sound emitting object whose angle difference is within a predetermined range is identified as a sound emitting object whose direction overlaps.

Further, the sound emission control step may cause the sound emitting object to stop emitting sound in accordance with a relationship between the respective sound volumes, the relationship being obtained from the identified overlapping sound emitting objects, for example, in a case where a difference between the respective sound volumes is equal to or greater than a predetermined level (for example, equal to or greater than 10 dB). Then, the game sound output step generates a sound signal from sound emitting objects other than the sound emitting object whose sound emitting operation has been stopped, and outputs a game sound heard at the hearing position.

In this way, wasteful use of channels is avoided by stopping the sound emission itself of a sound that can hardly be heard, under a situation where the directions of the sound emitting objects overlap and there is more than a predetermined amount of difference between the sound volumes. Those channels not being used can be allocated to other sound emitting objects effectively. Making the game sound that is eventually output (mixed sound) defective is thus avoided and a clear game sound can be output.

This allows adequately outputting a game sound emitted by a virtual sound emitting object disposed in virtual space.

An information recording medium according to a fourth aspect of the present invention stores a program for causing a computer (including electronic equipment) to serve as the above-described game sound output device.

A program according to a fifth aspect of the present invention causes a computer (including electronic equipment) to serve as the above-described game sound output device.

This program can be recorded on a computer-readable information recording medium including a compact disk, a flexible disk, a hard disk, a magneto-optical disk, a digital video disk, a magnetic tape and a semiconductor memory.

The program can be distributed and sold via a computer communication network, independently of a computer on which the program is executed. Further, the information recording medium can be distributed or sold independently of the computer.

Effect of the Invention

According to the present invention, appropriate control of a game sound is simply realized.

Figure 1:
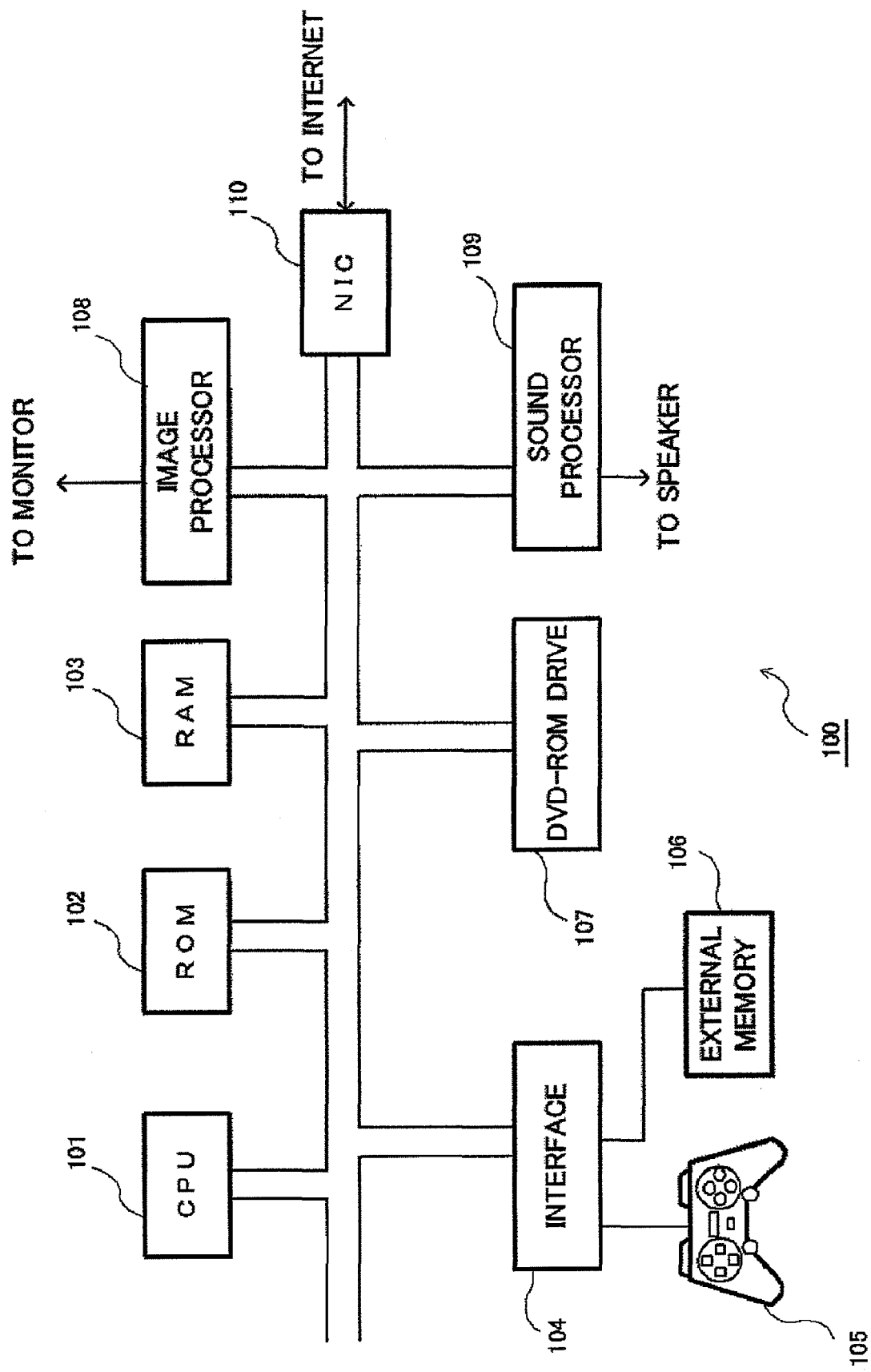
FIG. 1 is a schematic diagram showing a general configuration of a game device according to an embodiment of the present invention.

EXPLANATION OF REFERENCE NUMERALS 100 game device
101 CPU
102 ROM
103 RAM
104 interface
105 controller
106 external memory
107 DVD-ROM drive
108 image processor
109 sound processor
110 NIC
200 game sound output device
201 object storage unit
202 operating section
203 position management unit
204 image creating unit
205 overlap identifying unit
206 sound volume estimation unit
207 sound emission control unit
208 sound source
209 game sound output unit

BEST MODE FOR CARRYING OUT THE INVENTION

Embodiments of the present invention will be described in the following. For ease of understanding, the embodiments below of the present invention are described as applications to game devices. However, the present invention may be similarly applied to a variety of information processing devices, such as a computer, a PDA, or a mobile phone. In other words, the embodiments described in the following are provided to give explanations, not to limit the scope of the present invention. Therefore, those skilled in the art can adopt such embodiments as in which some or all of the elements herein have been replaced with respective equivalents, and such embodiments are also to be included within the scope of the present invention.

Embodiment 1

FIG. 1 is a schematic diagram illustrating a general configuration of a typical game device in which a game sound output device according to an embodiment of the present invention is realized. The following explanations are given with reference to this drawing.

A game device 100 is provided with a CPU (Central Processing Unit) 101, a ROM (Read Only Memory) 102, a RAM (Random Access Memory) 103, an interface 104, a controller 105, an external memory 106, a DVD (Digital Versatile Disc)-ROM drive 107, an image processor 108, a sound processor 109, and an NIC (Network Interface Card) 110.

By inserting a DVD-ROM storing a program and data for a game into the DVD-ROM drive 107 and powering on the game device 100, the program is executed, and the game sound output device of the present embodiment is realized.

The CPU 101 controls the general operation of the game device 100, and is connected to individual components for exchanging control signals and data.

Recorded in the ROM 102 is an IPL (Initial Program Loader), which is executed immediately after power-on. By executing the IPL, the program recorded on the DVD-ROM is read into the RAM 103, and execution of the program by the CPU 101 is commenced. Furthermore, the RAM 102 also stores programs and various data for an operating system necessary for controlling the overall operation of the game device 100.

The RAM 103 is for temporarily storing data and/or programs, and retains the program and/or data read out from the DVD-ROM, as well as data needed for other operations, such as advancing the game or conducting chat communication.

The controller 105, connected via the interface 104, receives control input made when a user plays a game. For example, the controller 105 accepts input of a character string (message) etc., in accordance with an operation input.

The external memory 106, being detachably connected via the interface 104, stores information such as data indicating game progress or chat logs (records), such information being stored in a rewritable manner. By issuing command input via the controller 105, the user can appropriately record such data on the external memory 106.

Recorded on the DVD-ROM loaded into the DVD-ROM drive 107 is the program for realizing the game, as well as graphical and audio data associated with the game. Under the control of the CPU 101, the DVD-ROM drive 107 conducts processing to read out the necessary program and/or data from the DVD-ROM loaded therein. The program and/or data read out are/is then temporarily stored in the RAM 103 or similar memory.

The image processor 108 processes data read from the DVD-ROM by using the CPU 101 and/or an image operation processor (not shown) provided in the image processor 108, and then records the resulting data in frame memory (not shown) provided in the image processor 108. The image information recorded in the frame memory is then converted into a video signal at a predetermined synchronous timing, and subsequently output to a monitor (not shown) connected to the image processor 108. This enables the display of a variety of images.

The image operation processor is capable of executing transparency operations such as overlaying two-dimensional images and a blending, as well as various saturation arithmetic calculations at high speeds.

In addition, the image operation processor is also capable of executing high-speed computations whereby polygon information, being disposed in a virtual three-dimensional space and having various kinds of texture information added thereto, is rendered by means of z-buffering, thereby acquiring a rendered image showing a view of the polygons disposed in the virtual three-dimensional space from a given point of view.

Furthermore, by means of the CPU 101 and the image operation processor operating in conjunction, it is possible to draw a string of characters as a two-dimensional image in the frame memory or on respective polygon surfaces, in accordance with font information that defines the shapes of the characters. Although the font information is recorded in the ROM 102, dedicated font information recorded on the DVD-ROM may also be used.

The sound processor 109 converts audio data read out from the DVD-ROM into an analog audio signal, and then causes the audio signal to be output from a speaker (not shown) connected thereto. In addition, under control of the CPU 101, the sound processor 109 also generates sound effects and music data that should be generated as the game progresses, and then causes a speaker to output sounds corresponding thereto.

The NIC 110 serves to connect the game device 100 to the Internet or a similar computer communications network (not shown). The NIC 110 may conform to the 10BASE-T/100BASE-T standard used when forming a LAN (Local Area Network), or alternatively, the NIC 110 may be made up of a modem, such as an analog modem for connecting to the Internet using a telephone circuit, an ISDN (Integrated Services Digital Network) modem, an ADSL (Asymmetric Digital Subscriber Line) modem, or a cable modem for connecting to the Internet using a cable television circuit, as well as an interface (not shown) that interfaces between the CPU 101 and any one of the above modems.

In addition, the game device 100 may also be configured to use a hard disk or similar large-capacity external storage device to perform functions equivalent to components such as the ROM 102, the RAM 103, the external memory 106, and the DVD-ROM loaded into the DVD-ROM drive 107.

Furthermore, it may also be possible to employ a mode wherein other devices, such as a keyboard for receiving input for editing character strings from a user, or a mouse for receiving input that specifies various types of positions and makes selections, are connected.

Furthermore, it is also possible to use a common computer (such as a general-purpose personal computer) as the game sound output device, instead of the game device 100 of the present embodiment. For example, a common computer is provided with a CPU, RAM, ROM, a DVD-ROM drive, and an NIC, similarly to the game device 100. Moreover, a common computer is also provided with an image processor having simplified functions compared to that of the game device 100, as well as a hard disk that serves as an external storage device. Besides the above, a common computer may also be configured to use storage media such as flexible disks, magneto-optical disks, and magnetic tapes. In addition, in a common computer, devices such as a keyboard and mouse are used as input devices, rather than a controller. Furthermore, after installing a game program, a common computer may function as a game sound output device by causing the program to be executed.

(General Configuration of Game Sound Output Device)

Figure 2:
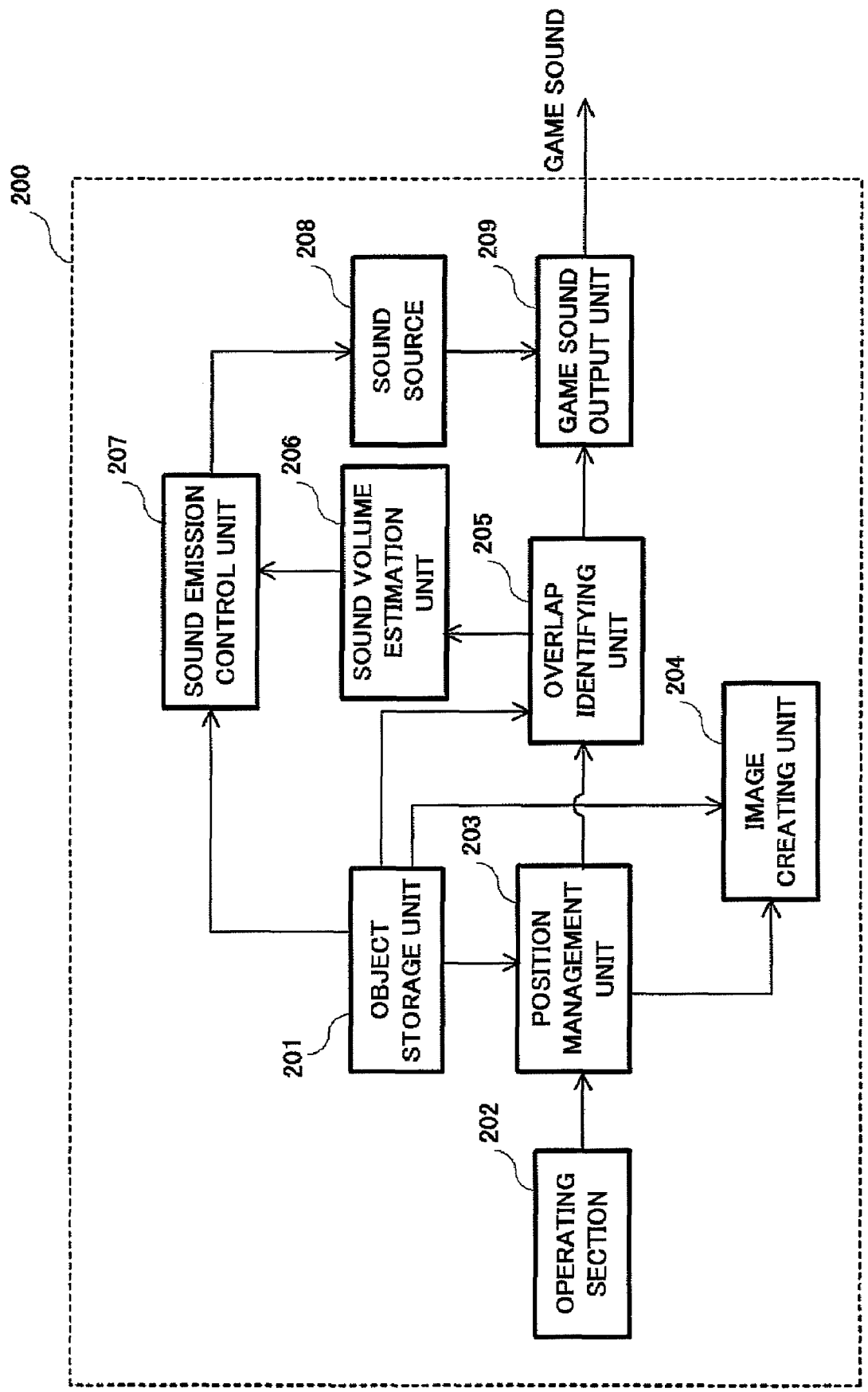
FIG. 2 is a schematic diagram showing a general configuration of a game sound output device according to an embodiment of the present invention.

FIG. 2 is a schematic diagram showing a general configuration of a game sound output device according to the present embodiment.

This game sound output device is, for example, one in which various sound emitting objects (for example, a gun, shoes, a screaming character), etc. and a hearing object (for example, a player character) that hears a sound emitted by the sound emitting object are disposed in a virtual space in a game device, and which outputs, as a game sound, sounds heard by the hearing object. The following explanations are given with reference to this drawing.

The game sound output device 200 is provided with an object storage unit 201, an operating section 202, a position management unit 203, an image creating unit 204, an overlap identifying unit 205, a sound volume estimation unit 206, a sound emission control unit 207, a sound source 208 and a game sound output unit 209.

First, the object storage unit 201 stores information regarding the various objects disposed in the virtual space.

For example, the object storage unit 201 stores information regarding various objects including a player-operated character (player character), various objects (a gun, shoes, a screaming character, etc.) emitting sound effects or the like.

The object that serves as a sound emitting object is associated with sound effect data or the like in a sound source 208 that will be described later.

The RAM 103 can serve as the object storage unit 201.

The operating section 202 receives a predetermined instruction information in accordance with the operation by a player. For example, the operating section 202 receives a move instruction or action instruction issued for the player character within the virtual space.

The controller 105 can serve as the operating section 202.

The position management unit 203 manages position information (current position, etc.) of objects including a player character and objects that serve as sound emitting objects, whose positions are changed within the virtual space. For example, since the player character changes its position in accordance with a move instruction or the like, received by the operating section 202, the position management unit 203 manages position information. Further, position information of those that move suitably (a screaming character, a gun retained by a predetermined character, shoes that are worn) between the objects serving as sound emitting objects, is managed similarly because their positions change within the virtual space.

The RAM 103 and the CPU 101 can serve as the position management unit 203.

The image creating unit 204 creates a game image based on information stored (managed) in the object storage unit 201 and the position management unit 203. For example, the image creating unit 204 locates an object stored in the object storage unit 201, such as a non-moving object, at a predetermined position in the virtual space, and locates the player character and objects, which move suitably and which are stored in the object storage unit 201, at a present position that is managed by a position management unit 203. Then, each object is perspective-transformed from a predetermined view point position. Then each object is subjected to a hidden-surface removal and texture mapping, etc. and a game image for display is generated.

Figure 3:
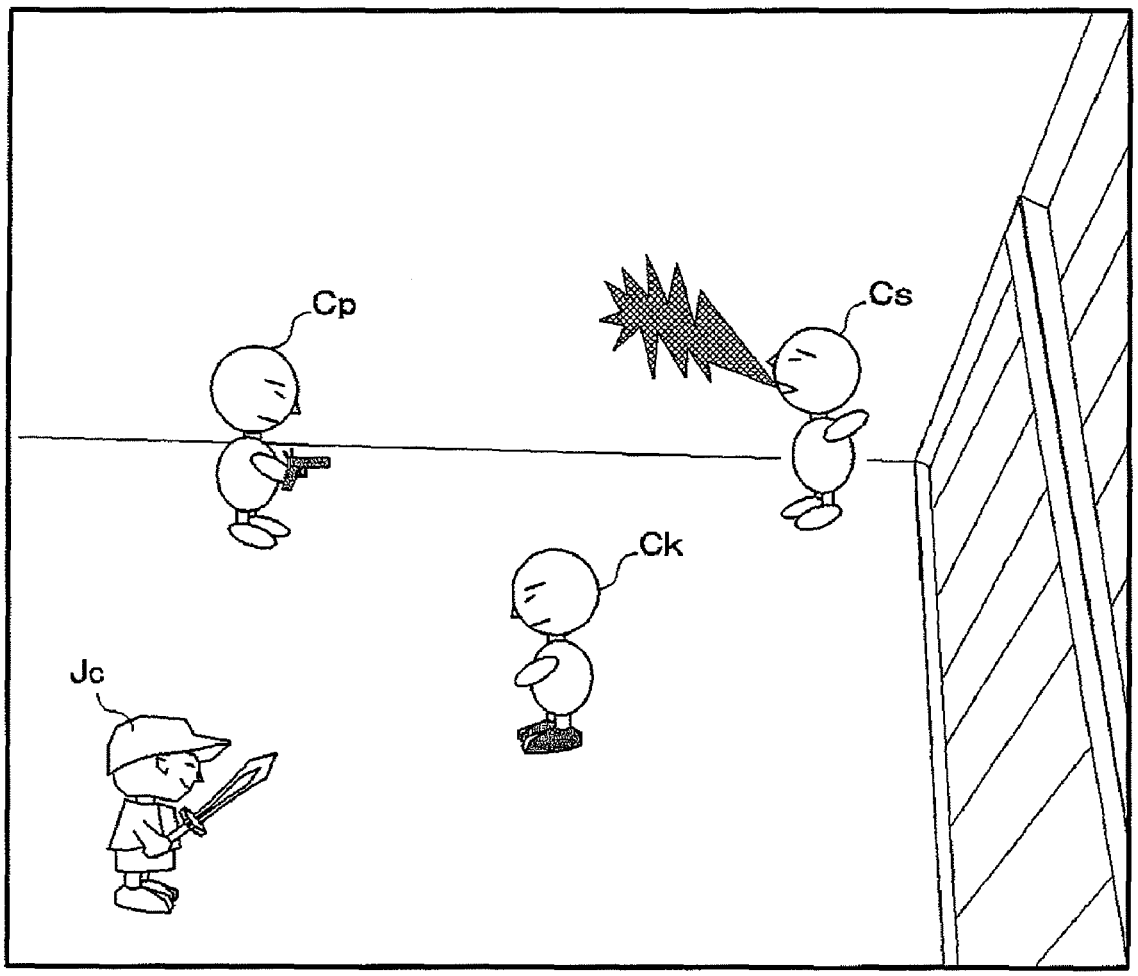
FIG. 3 is a schematic diagram showing one example of a game image in which characters are disposed along the wall.

Specifically, the image creating unit 204 creates a game image containing a player character Jc, a character having a gun Cp, a character wearing shoes Ck and a screaming character Cs, etc. as shown in FIG. 3.

The image processor 108 serves as such an image creating unit 204.

The overlap identifying unit 205 obtains directions of respective sound emitting objects with respect to the hearing position, and identifies each one of sound emitting objects whose directions overlap.

Specifically, the overlap identifying unit 205 obtains the directions of the respective sound emitting objects with respect to the position of the player character. Then, the overlap identifying unit 205 identifies, as overlapping objects, the respective sound emitting objects whose directions overlap within a predetermined range of angle (angle difference between the directions is within a predetermined range). That is, not only those sound emitting objects whose directions are completely the same, but also sound emitting objects, whose directions are within a predetermined range of angle difference, are identified as sound emitting objects whose directions overlap.

Figure 4A:
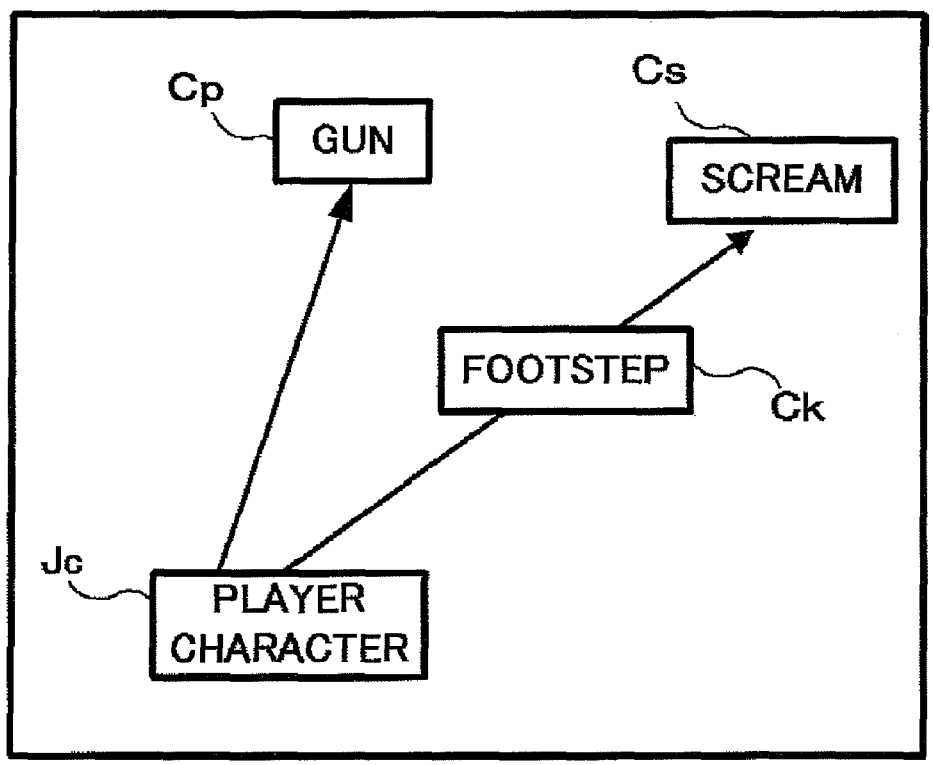
FIG. 4A is a schematic diagram for explaining a disposition of each object.
Figure 4B:
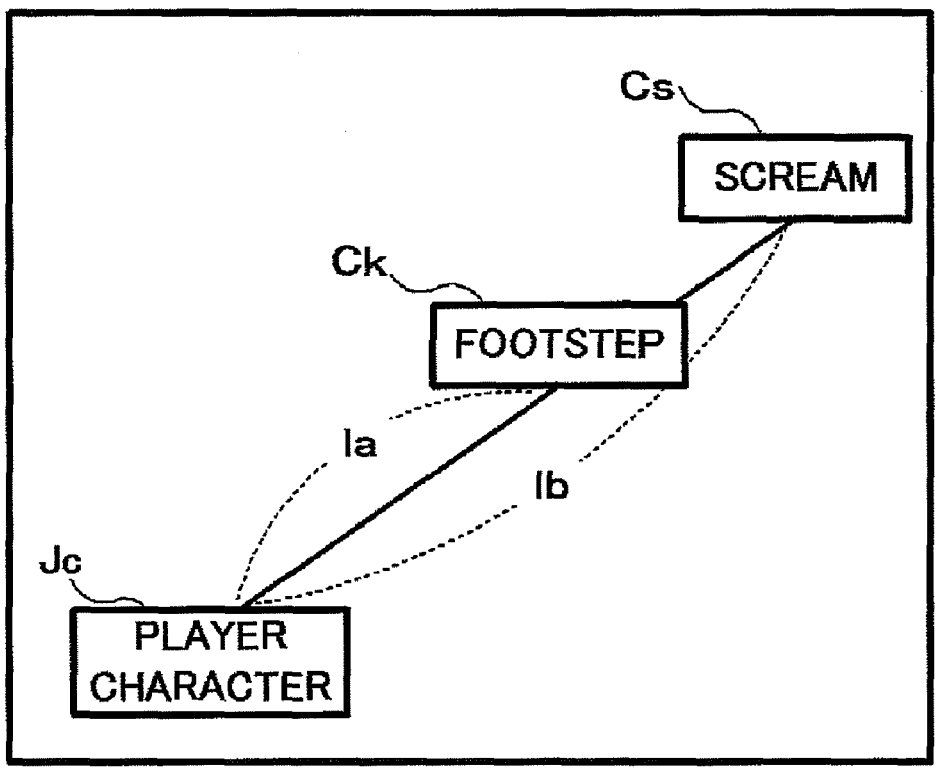
FIG. 4B is a schematic diagram for explaining a disposition of each object.

For example, in a case as shown in FIG. 4A, the overlap identifying unit 205 identifies the character wearing shoes Ck and the screaming character Cs as those characters whose directions overlap. FIGS. 4A and 4B show two-dimensional plane showing a three-dimensional virtual space as viewed from above. This is for convenience of explanation: more specifically, the directions of the respective objects are obtained in three-dimension (sterically), and those objects whose directions overlap are appropriately identified in the three-dimensional virtual space. The two-dimensional plane is used hereafter in the same manner as the above.

Then, the CPU 101, etc. can serve as such an overlap identifying unit 205.

The sound volume estimation unit 206 makes an estimation of the volumes of the sounds from the sound emitting objects identified as those whose directions overlap by the overlap identifying unit 205. That is, the volumes of the sounds as actually emitted and heard at the hearing position are obtained.

Specifically, as shown in FIG. 4B, the sound volume estimation unit 206 obtains a linear distance between the player character Jc and the character wearing shoes Ck and a linear distance 1*b* between the character Jc and the screaming character Cs. Then, the sound volume estimation unit 206 makes estimations of the sound volumes of the sound of shoes and a scream in consideration of natural attenuation in accordance with the linear distances 1*a* and 1*b*. The natural attenuation in accordance with distance is obtained by calculation in accordance with the natural law of sound, and is obtained by referring to a table in which distances are associated with natural attenuation (a table of attenuation curve, etc.)

For example, the sound volume estimation unit 206 calculates a sound volume as processed by a natural attenuation process using the numeric formula 1 indicated below.

Then, the CPU 101, etc. can serve as such a sound volume estimation unit 206.

$$Vr = Vset \times D1 \quad \text{[Formula 1]}$$

Vr: Sound Volume After Natural Attenuation Process
Vset: Set Sound Volume of Sound Emitting Object
D1: Natural Attenuation in Accordance with Distance 1

The sound emission control unit 207 causes either one of the sound emitting objects whose directions overlap to stop sound emission, in accordance with a relationship between the respective sound volumes estimated by the sound volume estimation unit 206.

More specifically, where the difference between the obtained sound volumes is a predetermined level or greater (for example, 10 dB or greater), the sound emission control unit 207 cancels sound emission of a sound emitting object whose sound volume is the smaller. That is, the sound emission itself that is hardly to be hard is stopped.

The CPU 101, etc. can serve as the sound emission control unit 207.

The sound source 208 manages various data that are to be bases of game sounds, and reproduces (generates) game sounds to be emitted by the respective sound emitting objects at the respective positions. For example, the sound source 208 comprises a PCM sound source, etc. and reproduces sound effects, etc. of a predetermined volume in accordance with the relationship between the position of the player character that is the hearing position, and the position of each object that is a sound emission position.

For those objects whose sound emission have been stopped by the above-described sound emission control unit 207, the sound effects, etc. are not reproduced. That is, the sound source 208 generates a sound signal from the sound emitting objects other than the canceled sound emitting objects.

Then, the sound processor 109, etc. can serve as such a sound source 208.

The game sound output unit 209 appropriately outputs game sounds reproduced from the sound source 208. For example, the game sound output unit 209 outputs as game sounds the sound reproduced in the sound source 208 from a predetermined speaker or the like.

The sound processor 109 can serve as such a game sound output unit 209.

(General Overview of Operation of Game Sound Output Device)

Figure 5:
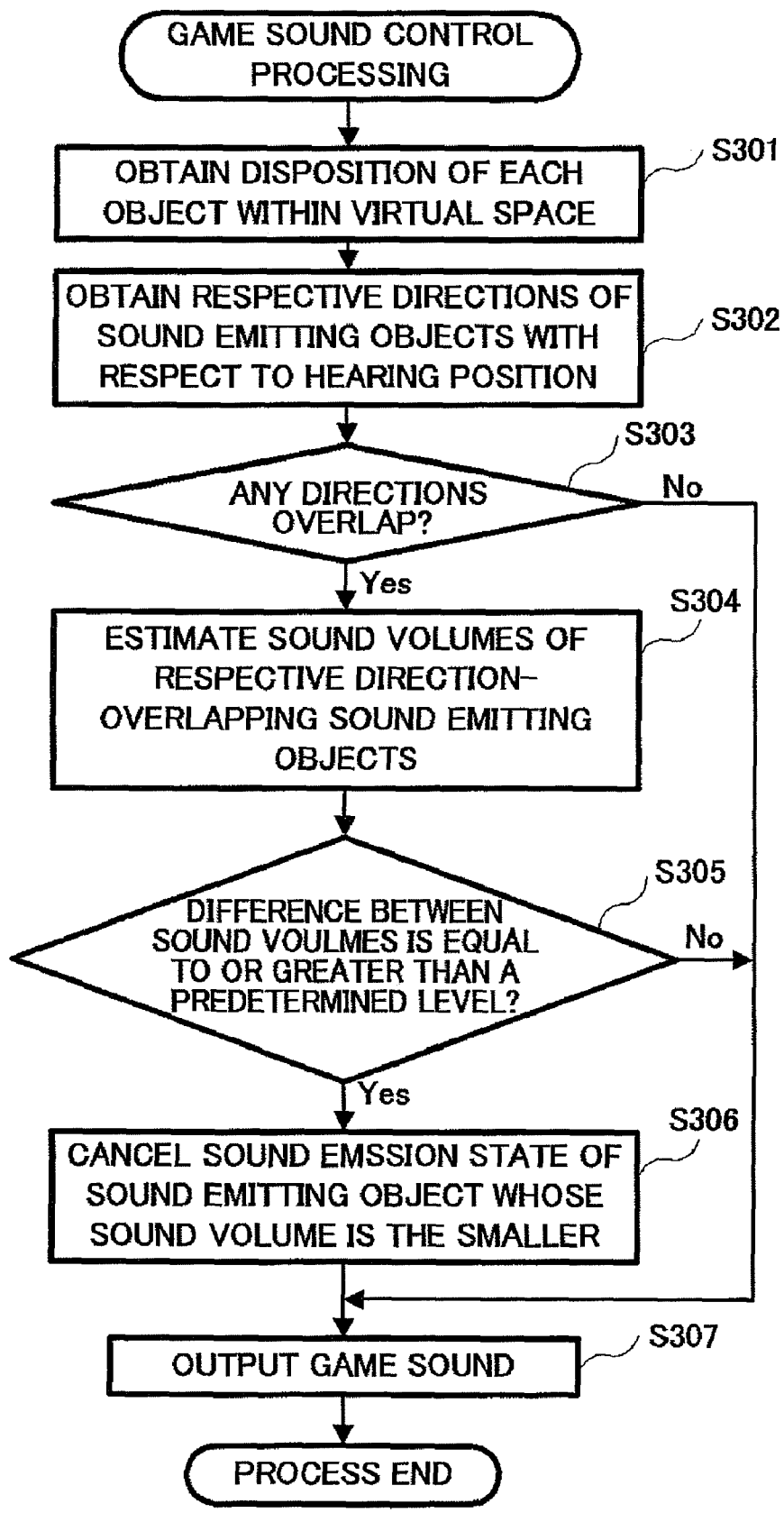
FIG. 5 is a flowchart showing an example of a method for controlling a game sound according to an embodiment of the present invention.

FIG. 5 is a flowchart showing the flow of the game sound control process executed in the game sound output device 200 having the abode-described configuration. Hereafter the operation of the game sound output device 200 will be described with reference to this diagram. This game sound control process is repeatedly executed in the progress of a predetermined game in which there are a player character and an object that serves as a sound emitting object, etc. in real time (i.e. per every sixtieth second).

First, the game sound output device 200 obtains the disposition of each object within the virtual space (step S301). That is, the game sound output device 200 obtains the disposition of the player character and other objects that serve as sound emitting objects in accordance with information stored (managed) in object storage unit 201 and position management unit 203.

The game sound output device 200 obtains the direction of each sound emitting object with respect to the hearing position (step S302). For example, as shown in the above-mentioned FIG. 4A, the game sound output device 200 obtains each direction of the character having a gun Cp, the character wearing shoes Ck and the screaming character Cs, with respect to the position of the player character Jc.

The game sound output device 200 determines whether there are any objects whose directions overlap (step S303). For example, in such case as shown in FIG. 4A, the overlap identifying unit 205 identifies the character wearing shoes Ck and the screaming character Cs as the objects whose directions overlap.

When the game sound output device 200 determines that there are no objects whose directions overlap (step S303; No), the game sound output device 200 proceeds the processing to step S307 that will be described later.

On the other hand, when the game sound output device 200 determines that there are any objects whose directions overlap (step S303; Yes), the game sound output device 200 estimates the respective sound volumes of those sound emitting objects whose directions overlap (step S304). For example, as shown in the above-described FIG. 4B, the game sound output device 200 obtains a linear distance 1*a* between the player character Jc and the character wearing shoes Ck, and a linear distance 1*b* between the character Jc and the screaming character Cs. Then, the sound volumes of the footsteps and screaming are estimated, with natural attenuation in accordance with the linear distances 1*a* and 1*b* being taken into account.

The game sound output device 200 determines whether a difference obtained from the estimated sound volumes is equal to predetermined level or greater (step S305). That is, the game sound output device 200 determines whether the difference between the sound volumes of the sound emitting objects whose directions overlap is, for example, 10 dB or greater.

When the game sound output device 200 determines that the difference between the sound volumes is not equal to or greater than the predetermined level (step S305; No), the game sound output device 200 proceeds the process to step S307 that will be described later.

On the other hand, when the game sound output device 200 determines that the difference between the sound volumes is equal to or greater than the predetermined level (step S305; Yes), the game sound output device 200 cancels the sound emission state of the sound emitting object whose sound volume is the smaller (step S306). That is, the sound emission state of the sound emitting object whose sound volume is the smaller of the sound emitting objects whose directions overlap is canceled.

Then, the game sound output device 200 outputs the game sound (step S307). That is, the sound source 208 reproduces sound effects or the like of a predetermined volume in accordance with the relationship between the position of the player character, which serves as the hearing position, and the positions of the objects serving as the sound emitting objects. Further, the game sound output unit 209 outputs the sound effects or the like reproduced at the sound source 208 as a game sound from a predetermined speaker or the like.

In such a game sound control processing, the directions of the respective sound emitting objects are obtained and the objects whose directions overlap with each other are identified. Then the respective sound volumes of the sound emitting objects whose directions overlap are estimated and the sound emission of a sound emitting object whose sound volume is the smaller is canceled when the difference between the sound volumes is equal to or greater than a predetermined level. That is, wasteful use of channels is avoided by stopping sound emission itself of a sound that is hardly to be heard, under a situation where the directions of the sound emitting objects (objects) overlap and there is more than a predetermined amount of difference between the sound volumes. Those channels not being used can be allocated to other sound emitting objects effectively.

Making the game sound that is eventually output (mixed sound) defective is thus avoided, as well as avoiding wasteful use of channels, and a clear game sound can be output.

This achieves appropriate output of a game sound emitted by a virtual sound emitting object disposed in virtual space.

Other Embodiments

In the above-described embodiment, the respective sound volumes of the objects whose directions overlap are estimated and the sound emitting state of a sound emitting object whose sound volume is the smaller is canceled where the difference between the sound volumes are equal to or greater than a predetermined level.

However, instead of canceling the sound emitting state of the sound emitting objects, the sound emission control unit 207 may virtually move a sound emission position of an overlapping sound emitting object to a position that does not cause overlap, while retaining its position of disposal of the sound emitting object on the screen as it is and moving only a sound emission position.

In this case, the sound emission control unit 207 virtually moves the sound emission position of either one of the sound emitting objects whose directions overlap, from the original position of disposal in accordance with a relationship between the respective sound volumes estimated by the sound volume estimation unit 206.

Specifically, the sound emission control unit 207 moves the sound emission position by allocating it to a plurality of sound emission positions that are determined based on the relationship between the hearing position and the disposal position in a case where the difference between sound volumes obtained from the estimated respective sound emitting objects is equal to or greater than a predetermined level (for example, equal to or greater than 10 dB).

Figure 6A:
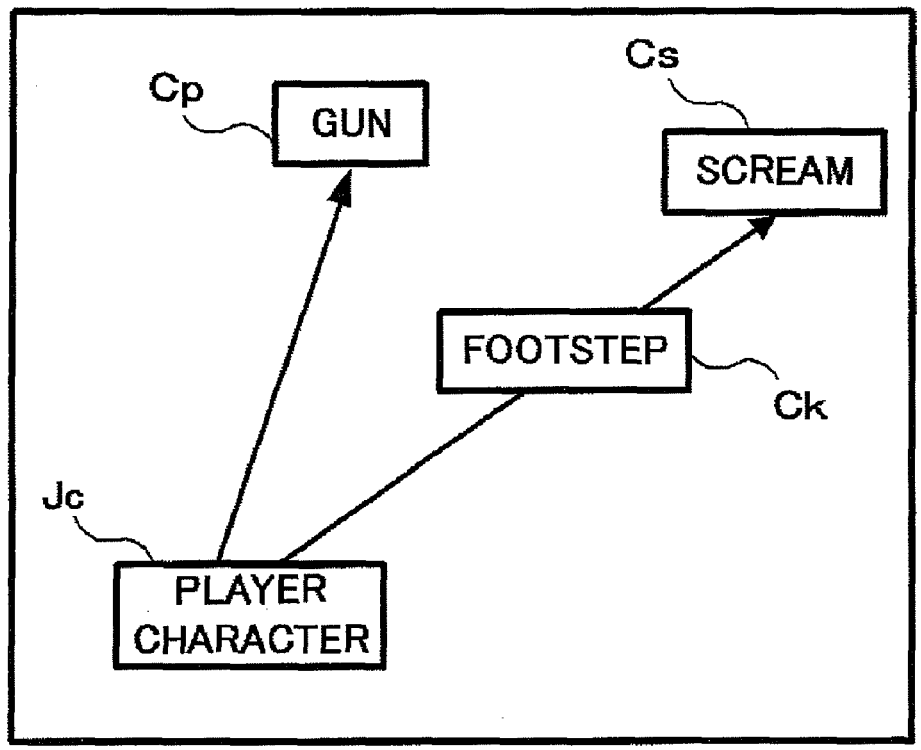
FIG. 6A is a schematic diagram for explaining virtually moving the sound emission position of the objects whose directions overlap.
Figure 6B:
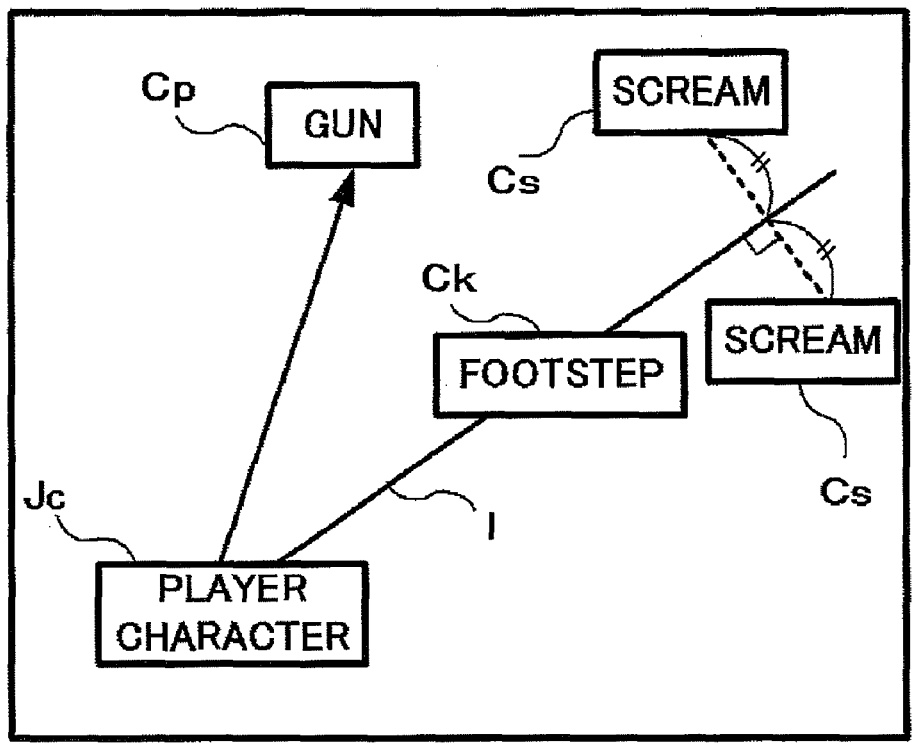
FIG. 6B is a schematic diagram for explaining virtually moving the sound emission position of the objects whose directions overlap.

For example, under a situation as shown in FIG. 6A, when the difference between the sound volumes of the sound of footstep of the character Ck and the sound volume of the scream of the character Cs is equal to or greater than a predetermined level (the sound volume of the scream is the smaller), the sound emission control unit 207, allocates the sound emission potion of the screaming character Cs to the predetermined symmetric positions with respect to the straight line 1, as shown in FIG. 6B.

In this allocation, since the character Cs serving as a sound emitting object is virtually divided into two, the set sound volumes at the sound source 208 that reproduces scream may each be reduced into ½.

Then the sound source 208 reproduces sound effects or the like of predetermined sound volumes in accordance with the relationship between the position of the player character Jc, serving as the hearing position, and the positions of respective objects (the position of virtually moved respective characters Cs) serving as the sound emission positions.

In this case, effective sound emission that can be heard by a player is made possible by moving a sound emission position of a sound that is hardly to be heard, from an original position of disposal to positions that do not cause overlap, under a situation where the directions of the sound emitting objects overlap and there is more than a predetermined amount of difference between the sound volumes. Making the game sound that is eventually output (mixed sound) defective is thus avoided and a clear game sound can be output.

Further, by virtually moving the sound emission position of the sound emitting objects, the direction of the sound emitting object at the destination of move and the direction of another sound emitting object may overlap. Accordingly, the overlap may be further identified at the destination of move of the sound emission position.

Figure 7A:
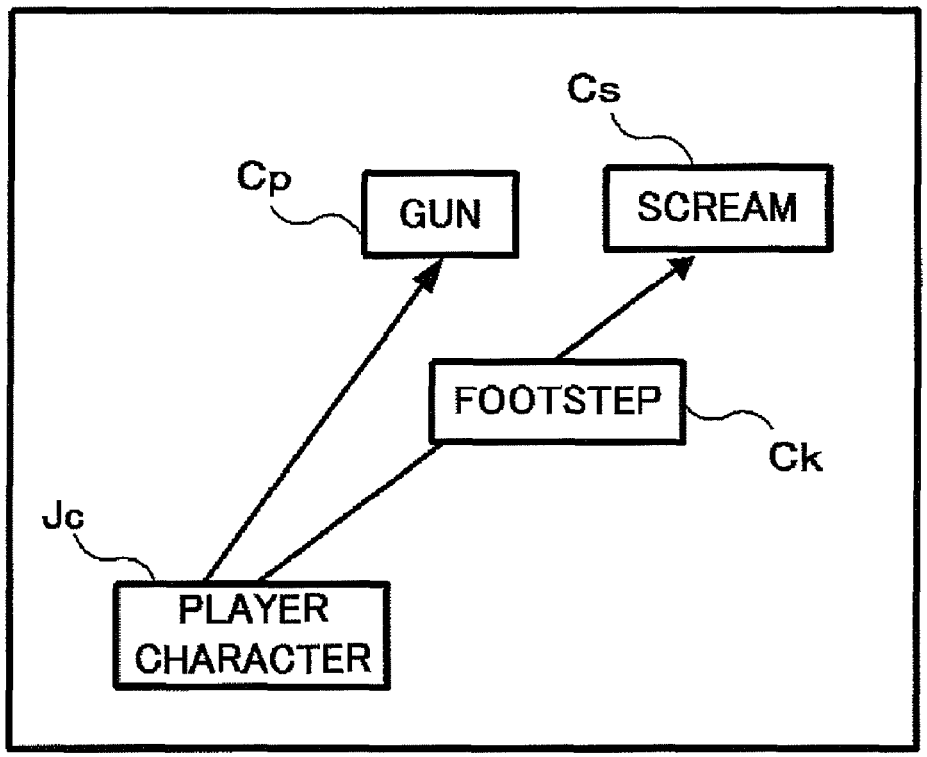
FIG. 7A is a schematic diagram for explaining a case where an object whose sound emission position is moved causes overlapping with another object.
Figure 7B:
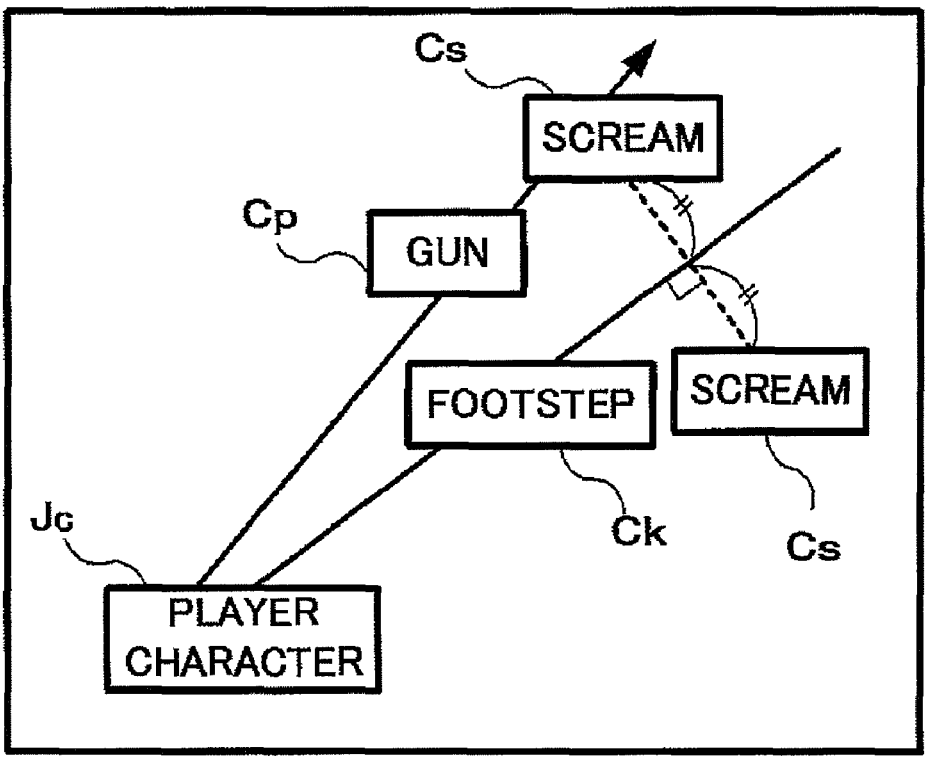
FIG. 7B is a schematic diagram for explaining a case where an object whose sound emission position is moved causes overlapping with another object.

For example, under such a situation as shown in FIG. 7A, the difference between the sound volume of the sound of footstep of character Ck and the sound volume of the scream of the character Cs is a predetermined level or greater (the sound volume of the scream is the smaller), similarly, the sound emission control unit 207 virtually moves the sound emission position of the screaming character Cs to the respective positions as shown in FIG. 7B.

In this move, one of the moved sound emission positions of the character Cs overlaps with the position of the character Cp. That is, the overlap identifying unit 205 again obtains the direction of the object whose sound emission position has been moved (in this case, each character Cs) with respect to the hearing position and identifies the overlap of the directions of the one of the characters Cs and the character Cp.

Then, in order to avoid an adverse effect that will be caused by the overlap accompanied by the move of the sound emission position, the sound emission control unit 207 cause the moved sound emitting object to stop sound emission.

The sound emission control unit 207 may stop only the sound emission at the sound emission position of one of the characters Cs that overlaps. Or, the sound emission control unit 207 may cause both the characters Cs to stop sound emission.

Further, in a case where an overlap is caused at the destination of move, instead of stopping sound emission, the sound emission positions of the overlapping objects may be further moved.

Also in these cases, making the game sound that is eventually output (mixed sound) defective is thus avoided and a clear game sound can be output.

In the above described embodiments, the explanation was made on a case where the player character hears the sound effects or the like emitted by the objects serving as sound emitting objects and the heard sounds are output as a game sound. However, there may be an application to the case wherein a virtual microphone is disposed in a virtual space and the sounds heard by the virtual microphone is output, besides the player character.

The present invention claims the priority based on the Japanese Patent Application No. 2006-166941 and the contents of this basic application is incorporated herein by reference.

Industrial Applicability

As described above, according to the present invention, it is possible to provide a game sound output device, a method for controlling game sound, an information recording medium, and a program that are suitable for adequately outputting a game sound emitted from a virtual sound emitting object disposed in virtual space.

The invention claimed is:

1. A game sound output device configured to output a game sound at a hearing position for a game in which first and second virtual objects and a virtual hearing point are disposed in a virtual space, each virtual object having a virtual sound, each virtual object having a virtual volume comprising:
    an overlap identifying unit that obtains respective directions of the virtual objects with respect to the virtual hearing point and determines if the directions of the first and second virtual objects overlap;
    a sound emission control unit that establishes a difference between the virtual volumes of the first and second virtual objects, if the directions overlap, and responsively sets a state of one of the first and second virtual objects to canceled if the difference meets a predetermined relationship; and
    a game sound output unit that generates a sound signal from the virtual objects other than a virtual object whose state is canceled and responsively outputs a game sound heard at the hearing position.

2. The game sound output device according to claim 1, further comprising:
    a sound volume calculation unit that calculates the respective virtual volumes of the virtual sounds of the first and second virtual objects as heard at the virtual hearing position.

3. The game sound output device according to claim 1, wherein a plurality of other virtual objects are disposed in the virtual space, each other virtual object having a virtual sound with a respective virtual volume, the sound emission control unit sets a state of each of the virtual objects to canceled if the respective virtual volume is a predetermined level smaller than a maximum of the virtual volumes associated with the virtual objects.

4. A game sound output device configured to output a game sound at a hearing position for a game in which first and second virtual objects and a virtual hearing point are disposed in a virtual space, each virtual object having a virtual sound, each virtual object having a virtual volume, comprising:
    an overlap identifying unit that obtains respective directions of the virtual objects with respect to the virtual hearing point and determines if the directions of the first and second virtual objects overlap;
    a sound emission control unit that moves a position in the virtual space of one of the first and second virtual objects if the first and second objects overlap; and
    a game sound output unit that generates a sound signal from the first and second virtual objects and responsively outputs a game sound heard at the hearing position.

5. The game sound output device according to claim 4, wherein
    the sound emission control unit moves the one of the first and second virtual objects a sound emitting object, whose sound volume is the smaller, to a plurality of sound emission positions determined based on a relationship between the virtual hearing position and a position of disposal, if a difference between the sound volumes is equal to or greater than a predetermined level.

6. The game sound output device according to claim 4, wherein
    the sound emission control unit causes a state of the moved virtual object to canceled if a direction of the moved virtual object overlaps with a direction of another virtual object.

7. A method for controlling a game sound output device configured to output a game sound at a hearing position for a game in which first and second virtual objects and a virtual hearing point are disposed in a virtual space, each virtual object having a virtual sound, each virtual object having a virtual volume, comprising:
    an overlap identifying step that obtains respective directions of the virtual objects with respect to the virtual hearing point position and determines if the directions of the first and second virtual objects overlap;
    a sound emission control step that establishes a difference between the virtual volumes of the first and second virtual objects, if the directions overlap, and responsively sets a state of one of the first and second virtual objects to canceled if the difference meets a predetermined relationship; and
    a game sound output step that generates a sound signal from the virtual objects other than a virtual object whose state is canceled and responsively outputs a game sound heard at the hearing position.

8. A non-transitory information recording medium storing a program that controls a computer configured to output a game sound at a hearing position for a game in which first and second virtual objects and a virtual hearing point are disposed in a virtual space, each virtual object having a virtual sound, each virtual object having a virtual volume, to function as:
    an overlap identifying unit that obtains respective directions of the virtual objects with respect to the virtual hearing point and determines if the directions of the first and second virtual objects overlap;
    a sound emission control unit that establishes a difference between the virtual volumes of the first and second virtual objects, if the directions overlap, and responsively sets a state of one of the first and second virtual objects to canceled if the difference meets a predetermined relationship; and
    a game sound output unit that generates a sound signal from the virtual objects other than a virtual object whose state is canceled and responsively outputs a game sound heard at the hearing position.

* * * * *